(12) United States Patent
Sabripour et al.

(10) Patent No.: US 10,579,740 B2
(45) Date of Patent: Mar. 3, 2020

(54) SYSTEM AND METHOD FOR CONTENT PRESENTATION SELECTION

(71) Applicant: MOTOROLA SOLUTIONS, INC., Chicago, IL (US)

(72) Inventors: Shervin Sabripour, Plantation, FL (US); Alejandro G. Blanco, Fort Lauderdale, FL (US); Goktug Duman, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 354 days.

(21) Appl. No.: 15/393,157

(22) Filed: Dec. 28, 2016

(65) Prior Publication Data
US 2018/0181562 A1 Jun. 28, 2018

(51) Int. Cl.
*G06F 3/0488* (2013.01)
*G06F 17/28* (2006.01)
*G06F 3/0482* (2013.01)

(52) U.S. Cl.
CPC ........ *G06F 17/2809* (2013.01); *G06F 3/0482* (2013.01); *G06F 3/0488* (2013.01); *G06F 3/04883* (2013.01); *G06F 2203/04808* (2013.01)

(58) Field of Classification Search
CPC combination set(s) only.
See application file for complete search history.

(56) References Cited

U.S. PATENT DOCUMENTS

| 8,560,959 | B2 | 10/2013 | Zaman et al. |
| 8,660,849 | B2 | 2/2014 | Gruber et al. |
| 8,687,023 | B2 | 4/2014 | Markiewicz et al. |
| 8,935,631 | B2 * | 1/2015 | Leonard ................ G06F 3/0488 715/788 |
| 9,460,058 | B2 * | 10/2016 | Maertens ................ H04W 4/20 |
| 2003/0040850 | A1 | 2/2003 | Najmi et al. |
| 2006/0015479 | A1 | 1/2006 | Wood et al. |
| 2008/0134030 | A1 | 6/2008 | Kansal et al. |
| 2010/0057646 | A1 | 3/2010 | Martin et al. |

(Continued)

FOREIGN PATENT DOCUMENTS

WO 2009130605 10/2009

OTHER PUBLICATIONS

Microsoft, "Using Context Menus," website (2016) 2 pages, https://msdn.microsoft.com/en-us/library/ms701740(v=vs.85).aspx.

(Continued)

*Primary Examiner* — Hien L Duong
(74) *Attorney, Agent, or Firm* — Michael Best & Friedrich LLP

(57) ABSTRACT

A system and methods for content presentation selection. One method includes displaying, on a display of a portable device, a plurality of tiles. The method includes receiving a first gesture-based input corresponding to a selected tile of the plurality of tiles. The method includes selecting a first application based on the content of the selected tile. The method includes superimposing, on or near a first portion of the selected tile, a first icon corresponding to the first application. The method includes receiving a second gesture-based input selecting the first icon. The method includes retrieving, from the first application, a first application view based on the content. The method includes replacing the selected tile with the first application view.

13 Claims, 15 Drawing Sheets

(56) References Cited

U.S. PATENT DOCUMENTS

| | | |
|---|---|---|
| 2010/0071000 A1 | 3/2010 | Amento et al. |
| 2011/0010307 A1 | 1/2011 | Bates et al. |
| 2011/0191316 A1 | 8/2011 | Lai et al. |
| 2011/0320307 A1 | 12/2011 | Mehta et al. |
| 2012/0047469 A1 | 2/2012 | Chelaru et al. |
| 2012/0162266 A1 | 6/2012 | Douglas et al. |
| 2013/0085847 A1 | 4/2013 | Dyor et al. |
| 2013/0263053 A1 | 10/2013 | Tritschler et al. |
| 2014/0049691 A1 | 2/2014 | Burdzinski et al. |
| 2014/0059599 A1 | 2/2014 | Sirpal et al. |
| 2014/0068674 A1 | 3/2014 | Sirpal et al. |
| 2014/0075479 A1 | 3/2014 | Soto et al. |
| 2014/0129942 A1 | 5/2014 | Rathod |
| 2014/0173457 A1 | 6/2014 | Wang et al. |
| 2014/0330865 A1* | 11/2014 | Xue ................ G06F 16/29 707/769 |
| 2014/0337791 A1 | 11/2014 | Agnetta et al. |
| 2014/0372218 A1 | 12/2014 | Talluri et al. |
| 2015/0007099 A1* | 1/2015 | Bernaudin ............ G06F 3/0484 715/783 |
| 2015/0153929 A1 | 6/2015 | Bernstein et al. |
| 2015/0212696 A1 | 7/2015 | Nordstrom |
| 2015/0278865 A1 | 10/2015 | Jain et al. |
| 2015/0331590 A1* | 11/2015 | Yasui .................. G06F 3/04842 715/765 |
| 2015/0332322 A1 | 11/2015 | Wu et al. |
| 2016/0029176 A1* | 1/2016 | Marti .................... H04W 4/029 455/456.3 |
| 2016/0077673 A1 | 3/2016 | Nagaralu et al. |
| 2017/0310789 A1* | 10/2017 | Thomee ................ H04L 67/327 |

OTHER PUBLICATIONS

Jaworski, "Engineer builds machine to swipe right on Tinder non-stop," website (2014) 4 pages, http://www.dailydot.com/debug/engineer-tinder-auto-swipe-machine/.

Nak Creative, "Tinder—Love at First Swipe," website (2014) 3 pages, http://www.freshprintmagazine.com/tinder-love-at-first-swipe/.

Android, "Pattern Swipe for Action," website (2016) 6 pages, http://unitid.nl/androidpatterns/uap_pattern/swipe-for-action.

PCT/USUS2017/064836 International Search Report and Written Opinion of the International Searching Authority dated Feb. 15, 2018 (17 pages).

International Preliminary Report on Patentability dated Jul. 2, 2019 for corresponding International Application No. PCT/US2017/064836 (10 pages).

\* cited by examiner

SYSTEM AND METHOD FOR CONTENT PRESENTATION SELECTION

BACKGROUND OF THE INVENTION

Workers (for example, public safety personnel, utility workers, and construction workers) responding to individual task requests (for example, incident reports, calls for service, and work orders) may use portable electronic devices to assist them during the performance of their duties. Some portable electronic devices, for example smart telephones, provide a suite of applications that interact with and consume data from computer systems that coordinate work and assign tasks to workers (for example, computer-aided dispatch systems and workflow ticketing systems). Such application suites offer workers access to many potentially relevant data points while responding to task requests.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
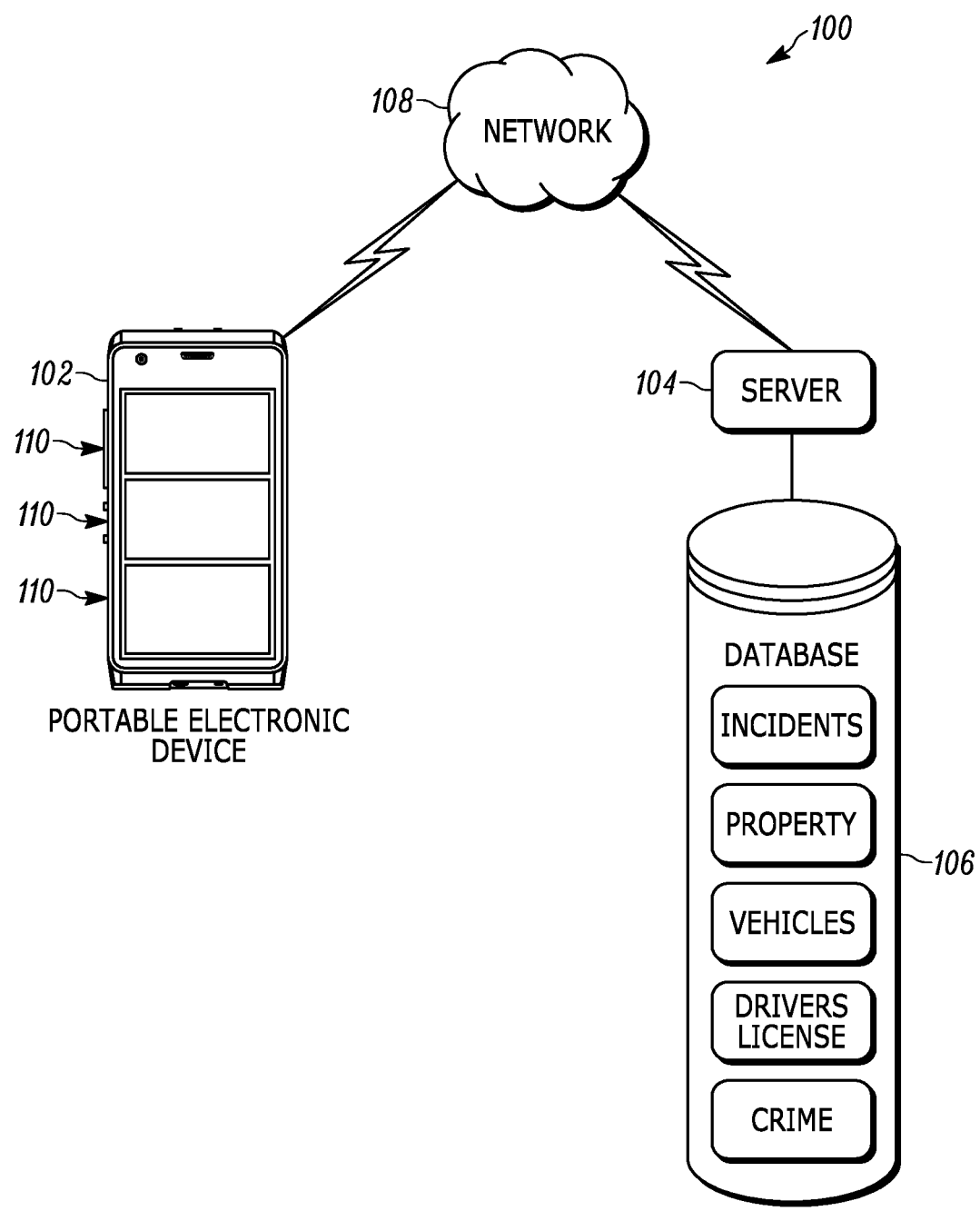
FIG. 1 is a diagram of a system for content presentation selection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel may use integrated application suites on portable electronic devices to access computer-aided dispatch and other information sources to aid them while on patrol or in responding to incidents (for example, reports of crime or traffic accidents). Public or private utility workers may use integrated application suites on portable electronic devices to access to access service repair and installation orders (for example, to install or repair utility poles, fire hydrants, transformers, control boxes, and the like). Such applications allow access to a large amount of potentially relevant content at any given time. However, transitioning between applications to access and assess the available content can take more time than may be desirable under the circumstances. Reducing the time spent interacting with portable electronic devices to select content increases the time available to perform other duties. Accordingly, methods and systems are provided herein for content presentation selection.

One example embodiment provides a method for content presentation selection. The method includes displaying, on a display of a portable device, a plurality of tiles. The method includes receiving a first gesture-based input corresponding to a selected tile of the plurality of tiles. The method includes selecting a first application based on the content of the selected tile. The method includes superimposing, on or near a first portion of the selected tile, a first icon corresponding to the first application. The method includes receiving a second gesture-based input selecting the first icon. The method includes retrieving, from the first application, a first application view based on the content. The method includes replacing the selected tile with the first application view.

Another example embodiment provides a system for content presentation selection. The system includes a display and an electronic processor coupled to the display. The electronic processor is configured to display, on the display, a plurality of tiles. The electronic processor is configured to receive a first gesture-based input corresponding to a selected tile of the plurality of tiles. The electronic processor is configured to select a first application based on the content of the selected tile. The electronic processor is configured to superimpose, on or near a first portion of the selected tile, a first icon corresponding to the first application. The electronic processor is configured to receive a second gesture-based input selecting the first icon. The electronic processor is configured to retrieve, from the first application, a first application view based on the content. The electronic processor is configured to replace the selected tile with the first application view.

Another example embodiment provides a method for content presentation selection. The method includes displaying, on a display of a portable device, a plurality of tiles. The method includes receiving a first gesture-based input corresponding to a selected tile of the plurality of tiles. The method includes in response to the first gesture-based input, determining, with an electronic processor of the portable device, a likely application based on the content of the selected tile. The method includes retrieving, from the likely application, a first application view based on the content. The method includes replacing the selected tile with the first application view.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of a system 100 for content presentation selection. In the example illustrated, the system 100 includes a portable electronic device 102, a server 104, a database 106, and a network 108. The portable electronic device 102 and the server 104 are communicatively coupled via the network 108. The network 108 is a communications network including wireless and wired connections. The network 108 may be implemented using a land mobile radio (LMR) network, a cellular network (for example, a Long Term Evolution (LTE) network), or a combination of both. However, the concepts and techniques embodied and described herein may be used with networks using other protocols, for example, Global System for Mobile Communications (or Groupe Spécial Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed network architectures. In some embodiments, communications with other external devices (not shown) occur over the network 108.

Figure 2:
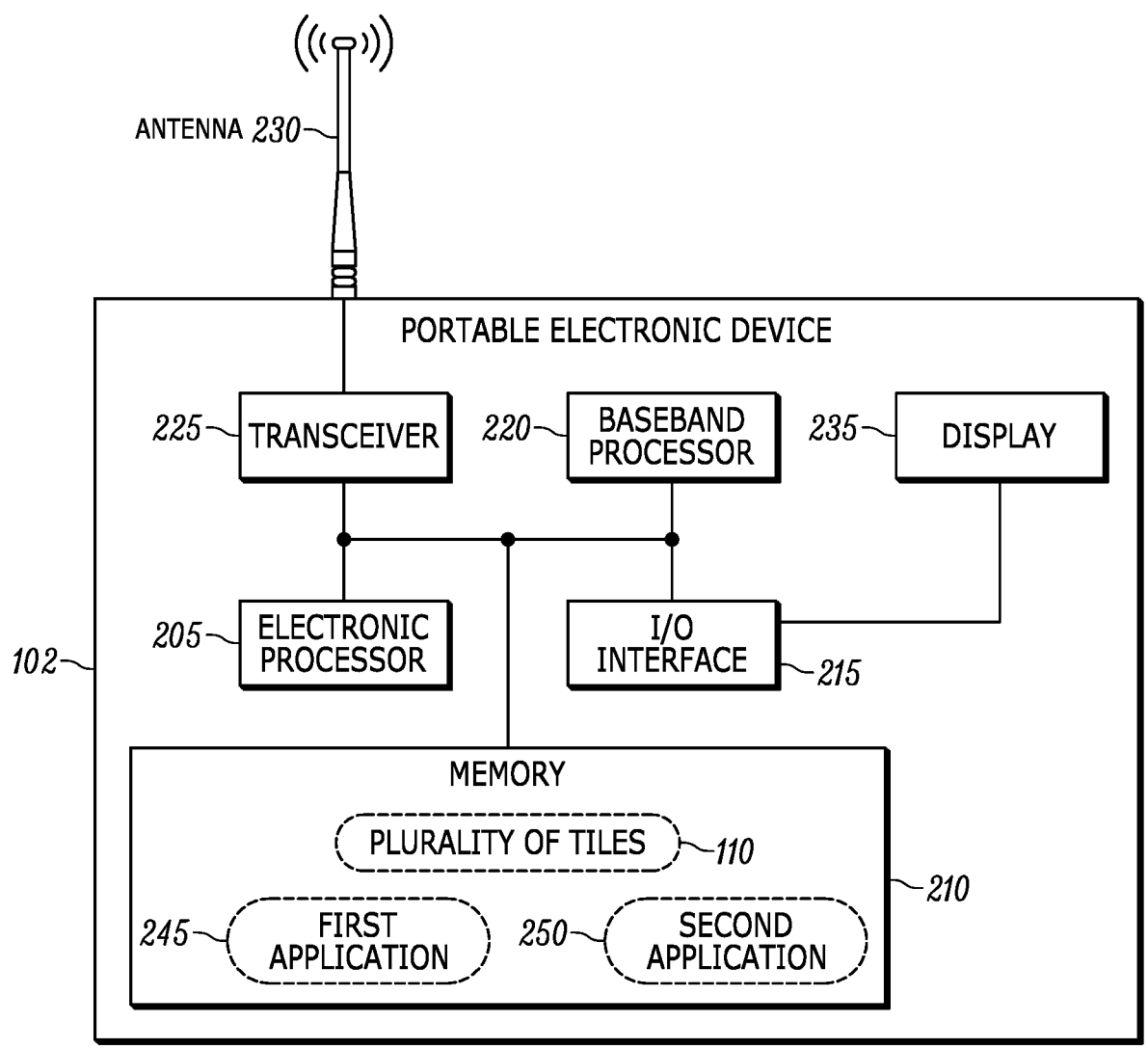
FIG. 2 is a diagram of a portable electronic device from the system of FIG. 1 in accordance with some embodiments.

The portable electronic device 102, described more particularly below with respect to FIG. 2, is a wireless communication device that includes hardware and software that enable it to communicate via the network 108. As described in detail below, the portable electronic device 102 is capable of receiving information from the server 104 and displaying the information through a graphical user interface using a plurality of tiles 110.

The server 104 is a computer server that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, computer-aided dispatch functions. The server 104 sends and receives data over the network 108 using the network interface.

The server 104 reads and writes data to and from the database 106. As illustrated in FIG. 1, the database 106 may be a database housed on a suitable database server communicatively coupled to and accessible by the server 104. In alternative embodiments, the database 106 may be part of a cloud-based database system external to the system 100 and accessible by the server 104 and the portable electronic device 102 over one or more additional networks. In some embodiments, all or part of the database 106 may be locally stored on the server 104. In some embodiments, the server 104 and the database 106 are part of a computer-aided dispatch or other workflow management system.

In some embodiments, as illustrated in FIG. 1, the database 106 electronically stores data on incidents (for example, crimes reported and responded to by one or more public safety agencies, repair orders, inspection orders, and the like), property (for example, residential and business real estate), vehicles (a motor vehicle department database, for example), driver's licenses, and crime (for example, information on past crimes committed locally or in other jurisdictions). Alternative embodiments may include more or fewer data types, or may include links to databases external to the system 100. It should be understood that, in some embodiments, the data stored in the database 106 is distributed among multiple databases that communicate with the server 104 and, optionally, each database may store specific data used by the server 104 as described herein. For example, in some embodiments, the database 106 is distributed as an incident database, a property database, a vehicle database, a driver's license database, and a crime database, or a combination thereof, which may be included in a common database server or separate database servers, included in the server 104, or a combination thereof.

FIG. 2 is a diagram of an example of the portable electronic device 102. In the embodiment illustrated, the portable electronic device 102 includes an electronic processor 205, a memory 210, an input/output interface 215, a baseband processor 220, a transceiver 225, an antenna 230, and a display 235. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, the plurality of tiles 110, a first application 245, and a second application 250 (described in detail below).

The input/output interface 215 is configured to receive input and to provide output to peripherals. The input/output interface 215 obtains information and signals from, and provides information and signals to, (for example, over one or more wired and/or wireless connections) devices both internal and external to the portable electronic device 102.

The electronic processor 205 is configured to control the baseband processor 220 and the transceiver 225 to transmit and receive video and other data to and from the portable electronic device 102. The baseband processor 220 encodes and decodes digital data sent and received by the transceiver 225. The transceiver 225 transmits and receives radio signals to and from various wireless communications networks (for example, the network 108) using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

The display 235 is a suitable display such as, for example, a liquid crystal display (LCD) touch screen, or an organic light-emitting diode (OLED) touch screen. The portable electronic device 102 implements a graphical user interface (GUI) (for example, generated by the electronic processor 205, from instructions and data stored in the memory 210, and presented on the display 235), that enables a user to interact with the portable electronic device 102.

As described in detail below, the portable electronic device 102 is capable of receiving and processing incident and other data (for example, as retrieved from the database 106), and displaying the data in the plurality of tiles 110 on the display 235 based on gesture-based inputs and the content of the data.

In some embodiments, the portable electronic device 102 is a smart telephone. In other embodiments, the portable electronic device 102 may be a tablet computer, a smart watch, a portable radio, a combination of the foregoing, or another portable or mobile electronic device containing software and hardware enabling it to operate as described herein.

Figure 3:
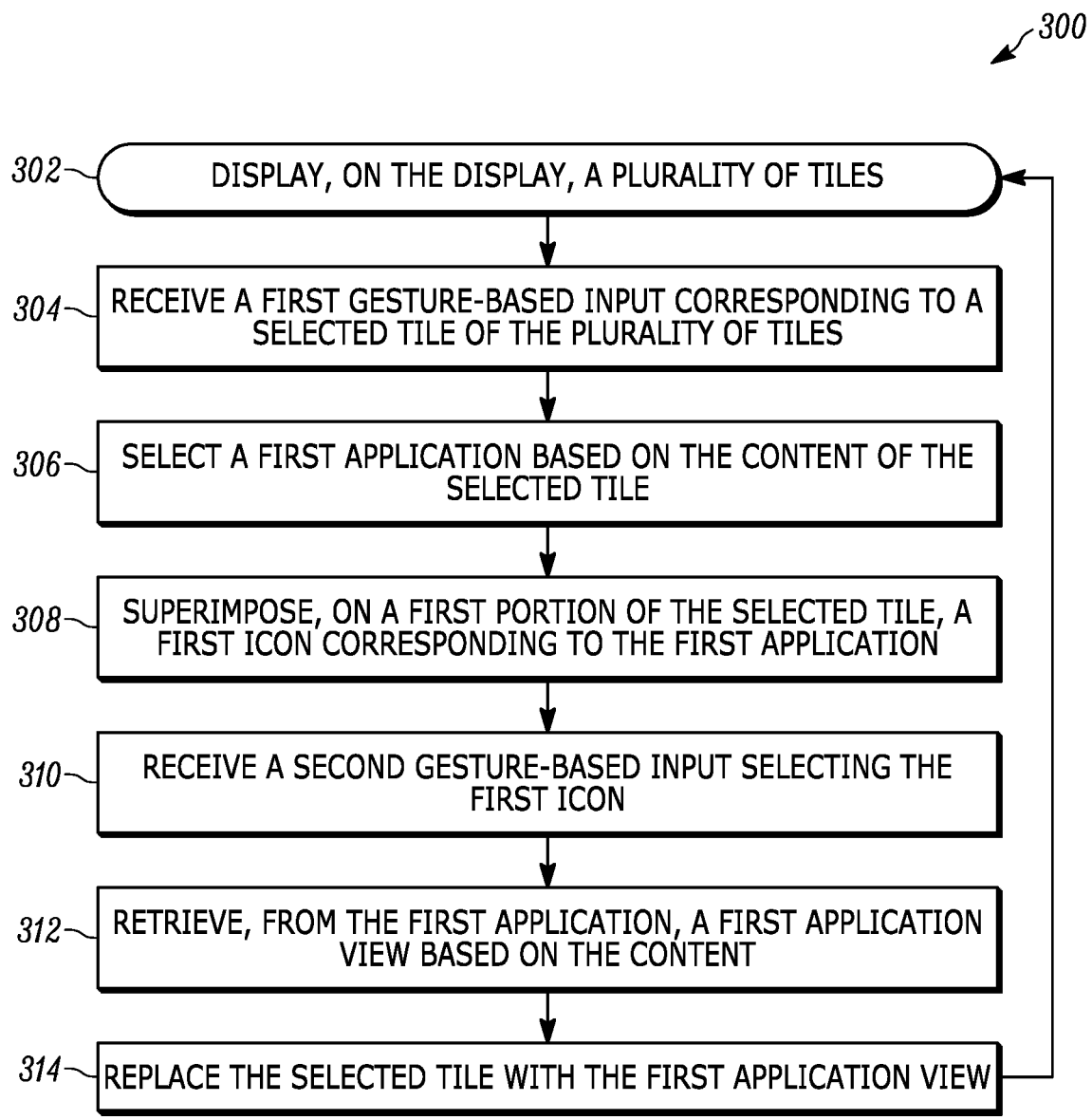
FIG. 3 is a flowchart of a method of content presentation selection in accordance with some embodiments.

FIG. 3 illustrates an example method 300 for content presentation selection on the portable electronic device 102. The method 300 is described with respect to FIGS. 4 through 7, which illustrate embodiments of a graphical user interface displayed on the display 235 of the portable electronic device 102. The method 300 is described as being performed by the portable electronic device 102 and, in particular, the electronic processor 205. However, it should be understood that in some embodiments, portions of the method 300 may be performed by other devices, including for example, the server 104.

Figure 4:
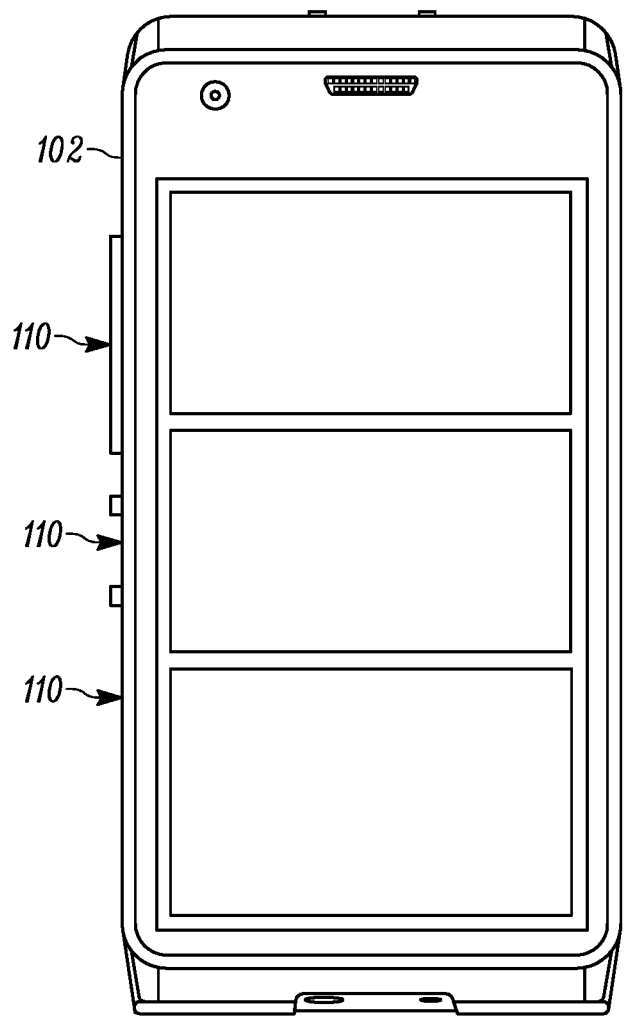
FIG. 4 is a graphical user interface for the portable electronic device of FIG. 2 in accordance with some embodiments.

At block 302, the electronic processor 205 displays, on the display 235, the plurality of tiles 110. As illustrated in FIG. 4, the plurality of tiles 110 is displayed by a vertically-scrolling application. The application may be, for example, a notes application, where each individual tile represents a text note. In another example, the application is a computer-aided dispatch application, where each tile represents an incident, the plurality of tiles 110 arranged in a timeline or some other order (for example, in order of priority or the incident's distance from the current location of the portable electronic device 102). In another example, the application is a messaging application, with each tile being a message or message thread. In another example, the plurality of tiles 110 may represent records from a relevant database, such as a list of currently-sought suspects, trouble spots (for example, based on crime data), vacant properties, or some other list of relevant data. In some embodiments, the application is a horizontally-scrolling application.

The plurality of tiles 110 is displayed by a graphical user interface that allows interaction with the interface using gesture-based inputs. Embodiments presented herein are described in terms of gestures received by a touch screen interface. Examples of gesture-based inputs include taps, touches, presses, long touches, long presses, swipes, and the like, all of which may be performed with a single finger or two fingers. This should not be considered limiting. In other embodiments, gestures may be received using virtual or augmented reality systems, which detect, for example, the movement of the eyes, arms, hands, or fingers. The receiving of gesture-based inputs is known and will not be described in detail.

Figure 5A:
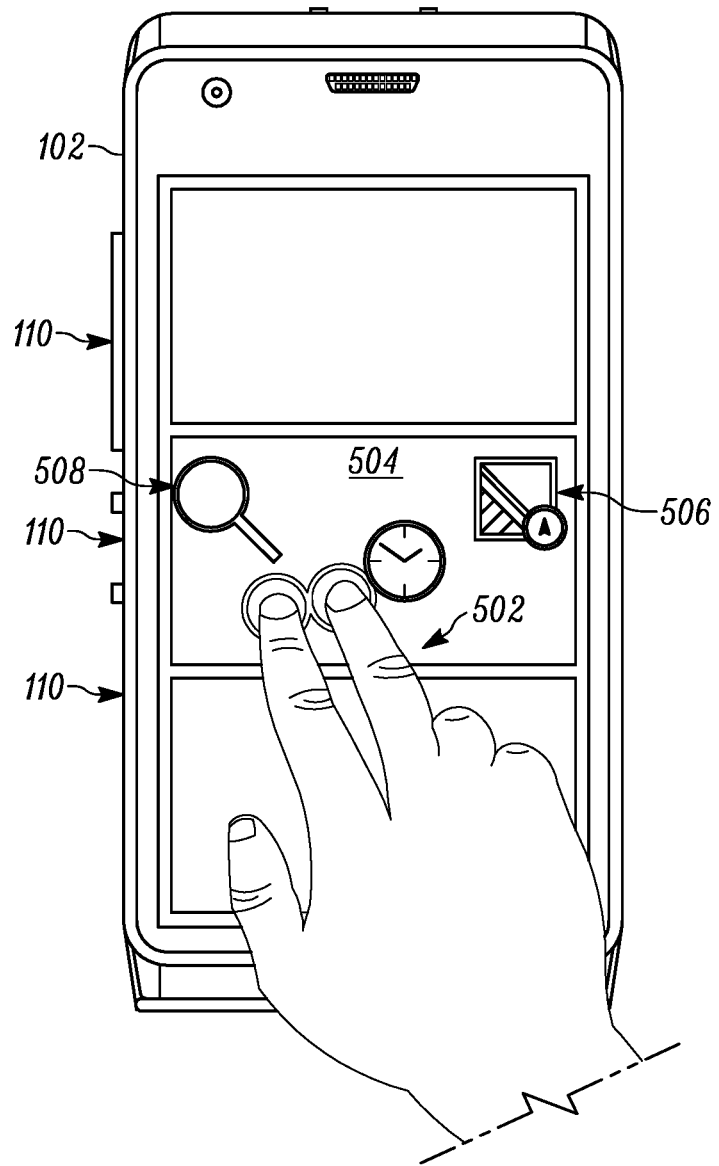
FIGS. 5A through 5C are a graphical user interface for the portable electronic device of FIG. 2 in accordance with some embodiments.

At block 304 (as illustrated in FIG. 5A), the electronic processor 205 receives a first gesture-based input 502 corresponding to a selected tile 504 of the plurality of tiles 110. As illustrated, the first gesture-based input 502 is a double-finger tap input or a double-finger press input. In other embodiments, the first gesture-based input 502 may be one of a single-finger long touch input, a single-finger press input, or another suitable gesture-based input.

At block 306, the electronic processor 205 selects a first application 245 (see FIG. 2) based on the content of the selected tile 504. In some embodiments, the electronic processor 205 identifies a data type by performing natural language processing. The natural language processing may include identifying entities in the content, relationships between entities, qualifiers on entities, handle negation, verb tense, and other grammatical and semantic processing. For example, the electronic processor 205 may perform natural language processing on the content to extract at least one keyword from the content of the selected tile 504 and select an application that closely maps to the keyword. For example, if a keyword extracted is a name the first application may be an application that searches a database of people.

In some embodiments, the electronic processor 205 identifies a data type based on one or more results of the natural language processing (for example, an extracted keyword or keywords). For example, when one of the keywords is an automobile make, the data type may be a vehicle description. In another example, when one of the keywords is an incident number, the data type may be an incident report. Other data type examples include a person description and an address.

In some embodiments, the electronic processor 205 may select the first application based on the data type. For example, when the data type is a person description, a people search, a citation search, or a property search application may be selected. In another example, when the data type is a vehicle description, a vehicle search may be selected. In another example, when the data type is an address, a property owner search application may be selected. In another example, when the data type is an address, a mapping application may be selected (for example, providing a map with a layer showing information relevant to the address). In another example, when the data type is an incident identifier, an incident management application may be selected.

Natural language processing may be used to intelligently select applications to offer, and the data to use for those applications. For example, the content of the selected tile 504 may describe interviewing a witness, who mentions a possible suspect. In such case, the electronic processor 205 may use natural language processing to recognize these semantics, and offer to search the suspect name instead of the witness name. In another example, the electronic processor 205 may use natural language processing to recognize that a name refers to a work partner versus a person of interest, and offer to contact the work partner, as well as search on the person of interest.

In some embodiments, the electronic processor 205 uses known contextual information to determine relevancy when identifying a data type, selecting an application, or both. For example, content that mentions "Officer Jones" may offer an incident management application when it is known that the current user and Officer Jones are both assigned to the same incident. Contextual information may also be role or skill-based. For example, content that describes a medical concern could offer to contact the closest medical first responder on duty.

In some embodiments, the electronic processor 205 may select more than one application for a single data type. For example, where the content includes an address, a mapping application may be selected. When, for example, contextual or other information indicates that the address is also included in a recently dispatched incident, the incident management application may also be selected. In some embodiments, the electronic processor 205 may select both applications. In other embodiments, the electronic processor 205 may prioritize one application over the other, based on analysis of the content. For example, when the electronic processor 205 determines that the current user has been dispatched to, but has not yet arrived at the address, it may prioritize the mapping application over the incident management application. In another example, when the electronic processor 205 determines that the current user has been dispatched to cover the incident, but has not acknowledged the dispatch order, it may prioritize the incident management application over the mapping application.

At block 308, the electronic processor 205 superimposes or otherwise combines, on or near a first portion of the selected tile 504, a first icon 506 corresponding to the first application 245. In the embodiment illustrated, the icon 506 corresponds to a mapping application. In some embodiments, the electronic processor 205 selects a second application 250 (see FIG. 2) based on the content of the selected tile 504. In some embodiments, the selection of the second application 250 is performed similarly to the selection of the first application 245. In some embodiments, the second application 250 may be a default application, for example a search application, which searches the database most relevant to the data type for the content. Regardless of how the second application 250 is selected, the electronic processor 205 similarly superimposes, on or near a second portion of the selected tile 504, a second icon 508 corresponding to the second application 250. In the example illustrated, the magnifying glass icon signifies that the second application 250 is a search application. In the embodiment illustrated, the first and second icons 506, 508 are positioned to the right and left of the selected tile 504, respectively. In other embodiments, three or more applications are selected based on the content and icons corresponding to those applications are superimposed in the selected tile 504, for example, at the top or bottom of the selected tile 504.

Figure 5B:
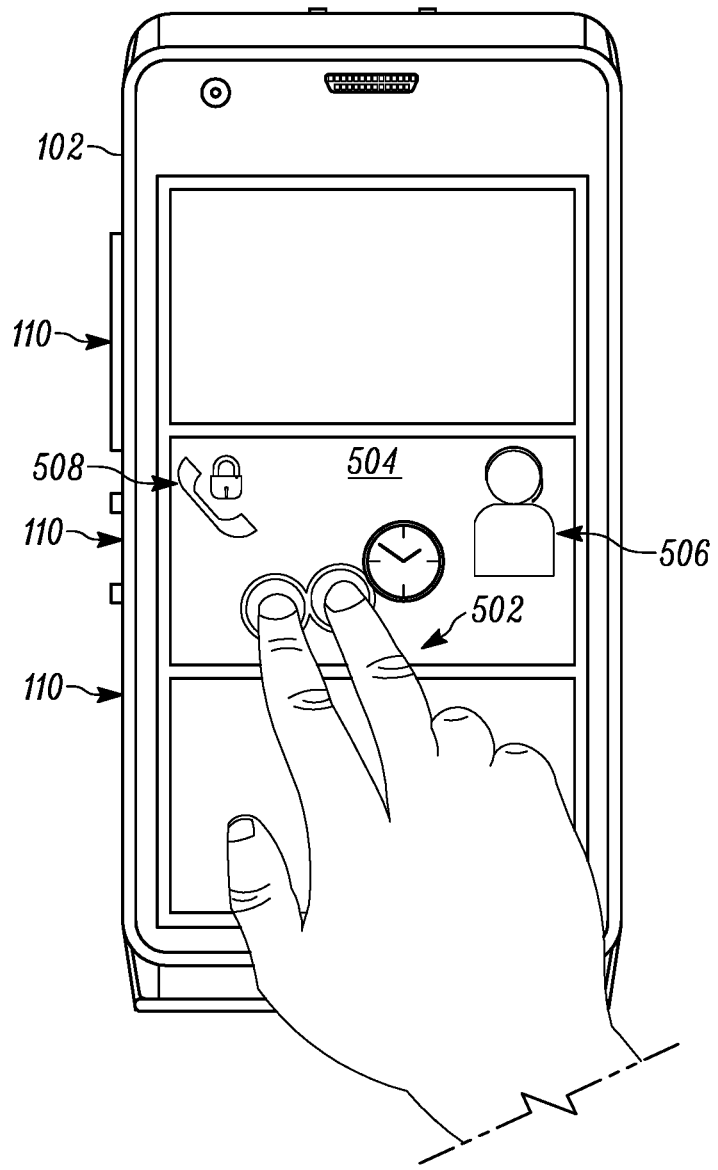
Figure 5C:
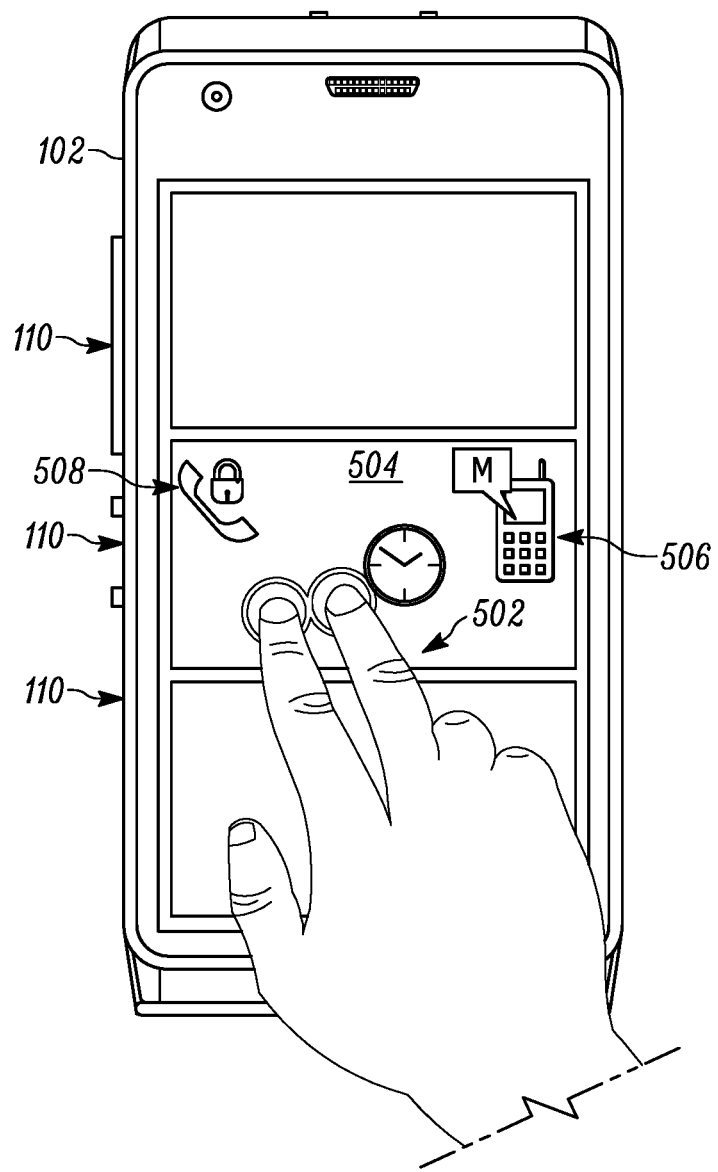

FIGS. 5B and 5C illustrate other examples of icons corresponding to applications based on the content of the selected tile 504. For example, the content may include the name and contact information for a person, and the first and second icons 506, 508 correspond to contacting the person using phone, push-to-talk, or messaging applications.

In some embodiments, the electronic processor 205 may implement blocks 306 and 308 automatically for all of the plurality of tiles 110, without receiving the first gesture 502. In some embodiments, the applications are determined and icons displayed as each of the plurality of tiles 110 appears on the display 235 (for example, as a user scrolls through the plurality of tiles 110).

Figure 6A:
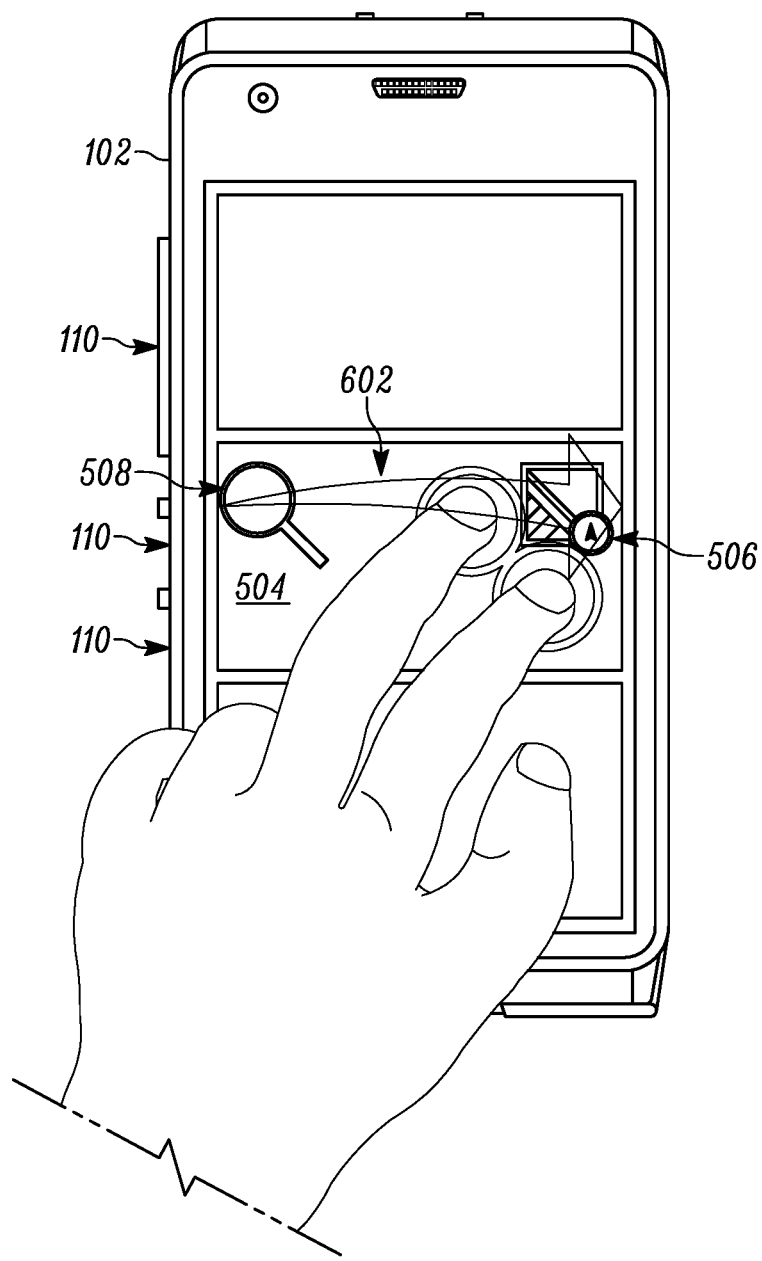
FIGS. 6A and 6B are a graphical user interface for the portable electronic device of FIG. 2 in accordance with some embodiments.
Figure 6B:
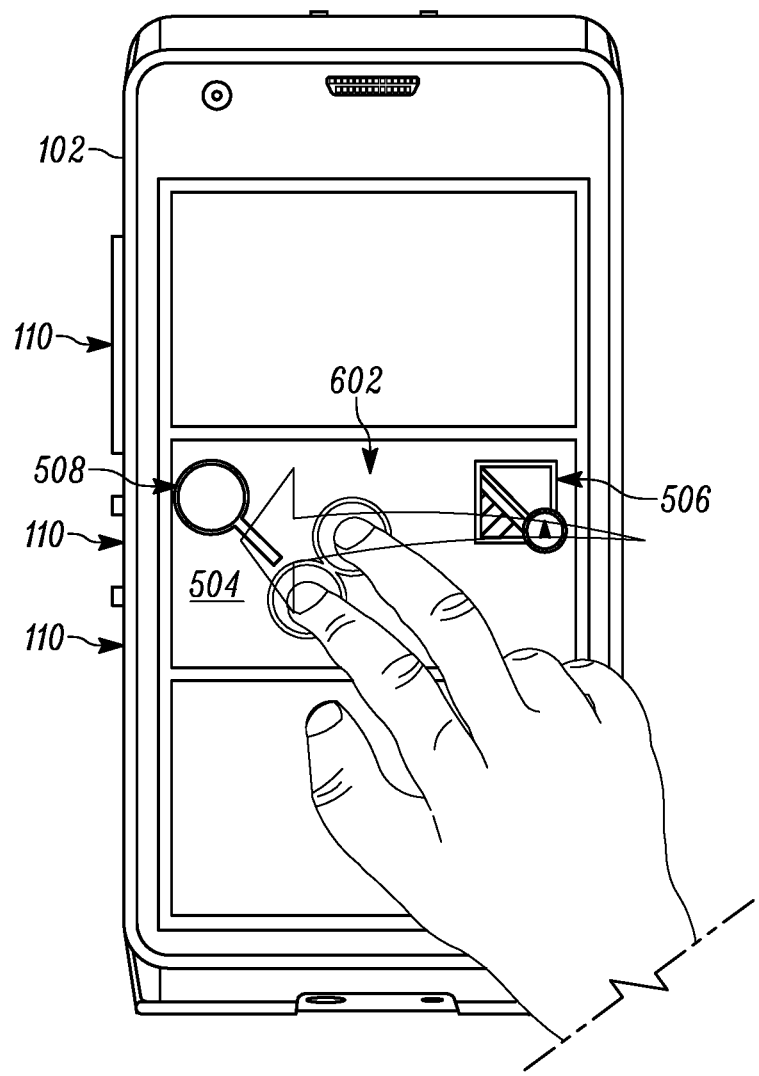

When applications are determined and icons displayed, one of the icons may be selected. At block 310, the electronic processor 205 receives a second gesture-based input 602 selecting the first icon 506, as illustrated in FIG. 6A. Similarly, the electronic processor 205 may receive a second gesture-based input 602 selecting the second icon 508, as illustrated in FIG. 6B. As illustrated in FIG. 6A and FIG. 6B, the second gesture-based input 602 may be a swipe input gesture. For ease of description, a swipe gesture is illustrated moving toward the icon being selection. In some embodiments, the second gesture-based input 602 may begin on the icon being selected, and drag the icon in any direction (for example, to move it off the screen) in order to select the icon.

Figure 7A:
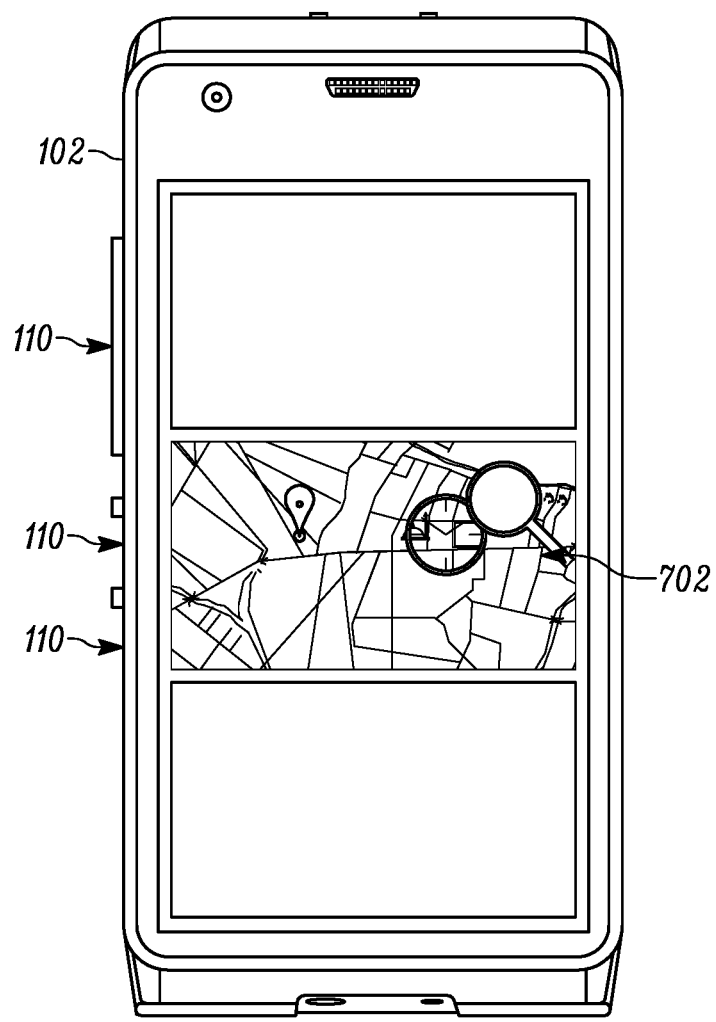
FIGS. 7A and 7B are a graphical user interface for the portable electronic device of FIG. 2 in accordance with some embodiments.
Figure 7B:
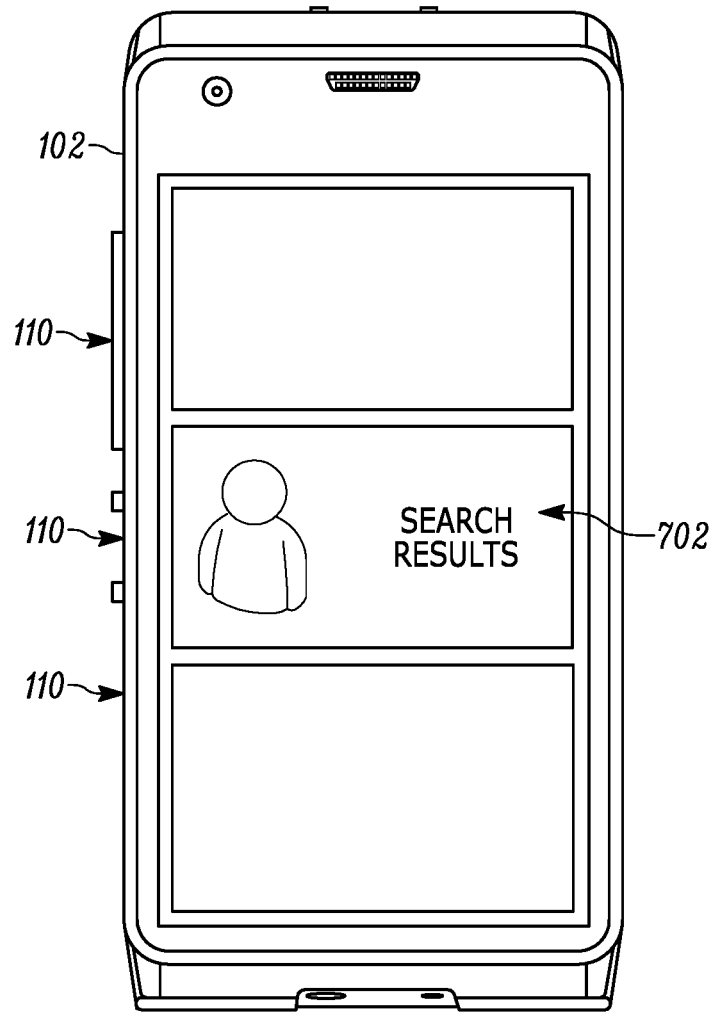

At block 312, the electronic processor 205 retrieves, from the first application 245, a first application view 702 based on the content of the selected tile 504, as illustrated in FIGS. 7A and 7B. For example, when the content of the selected tile 504 includes an address, the first application view 702 may be a map (see FIG. 7A). In another example, when the content of the selected tile 504 includes a person or a vehicle description, the first application view 702 may be search results, including images, text, or both (see FIG. 7B).

The electronic processor 205 identifies what information is to be included in the first application view 702 based on the analysis of the content from the selected tile 504, as described above. For example, the electronic processor 205 may retrieve the first application view based on the data type. In another example, when the content includes the name of a partner, the first application view 702 may be a map showing the partner's current location. In another example, when the content includes the name of a suspect, the first application view 702 may include recent incidents involving that suspect.

In another example, the electronic processor selects a mapping application based on an address present in the content of the selected tile 504. As illustrated in FIG. 6A and FIG. 7A, the first icon 506 corresponds to a mapping application and the first application view 702 is a map. The electronic processor 205 determines a map view based on the address, and determines a virtual barrier or geofence based on the address. The map view determines the type of map produced. For example, the map view may be an overhead view, similar to a plan view. The map view may also be a perspective or simulated three-dimensional view of an area around the address. The map view may also determine which layers (for example, geographic information system (GIS) layers) to display based on the address or other content in the selected tile 504. The geofence may be a boundary for the map, for example, based on the locations of other personnel near the address. In some embodiments, the map view and geofence may be based on content from the selected tile 504 indicating whether the content is of an urgent nature. For example, for an address in an active call for service, the geofence may include other personnel able to respond to the call, whereas an address in a historical incident record may generate a map view showing other nearby incidents around the time of the historical incident. After determining the map view and the geofence, the electronic processor 205 retrieves, from the first application 245 (that is, the mapping application), a map based on the map view and the geofence. In some embodiments, the electronic processor 205 may retrieve a map view based on only one of the map view and the geofence, or based on other factors. Similar contextual elements may apply to other applications, similar to how geofence and layers apply to mapping. For example, based on the content, a calling or push-to-talk application may determine that the call should be a high priority, or emergency call. In another example, a search application may perform two searches when both a name and a vehicle are in the content.

At block 314, the electronic processor 205 replaces the selected tile with the first application view 702, as illustrated in FIGS. 7A and 7B. Accordingly, a user operating the portable electronic device 102 is able to obtain relevant content while remaining in the original application, which provides the plurality of tiles 110. As illustrated in FIG. 3, the method 300 may repeat, allowing the selection of another of the plurality of tiles. The user may thereby access relevant content from many application sources, without having to navigate between those applications.

Figure 8A:
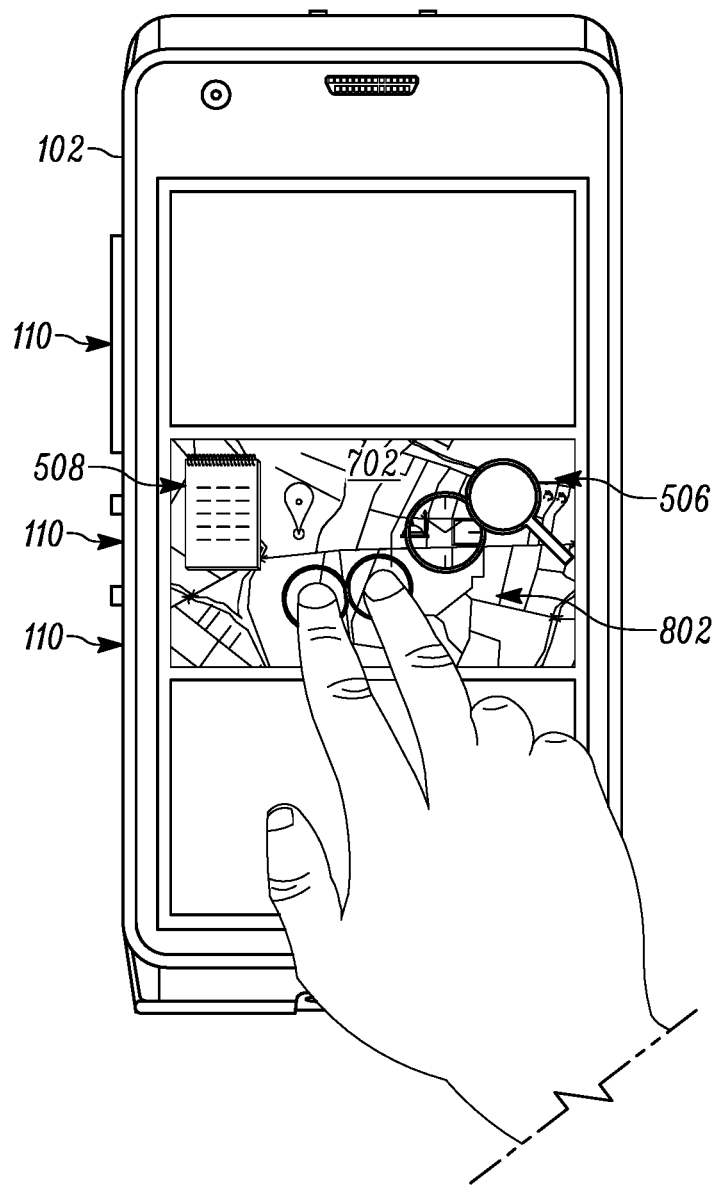
FIGS. 8A through 8C are a graphical user interface for the portable electronic device of FIG. 2 in accordance with some embodiments.
Figure 8B:
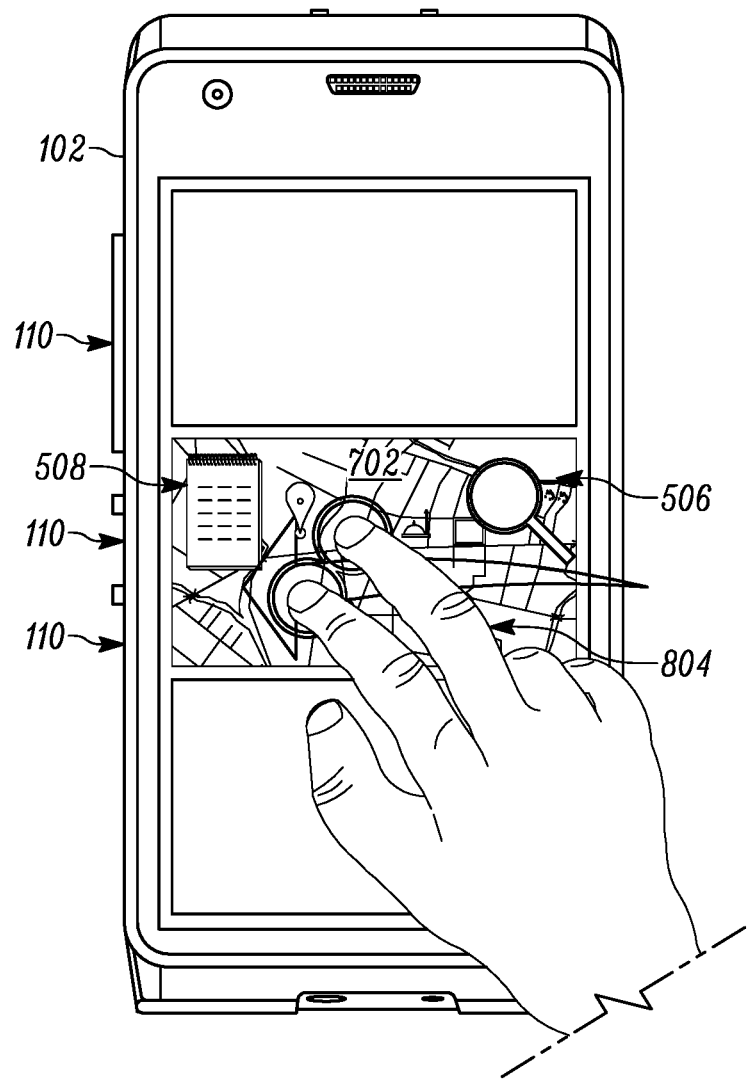
Figure 8C:
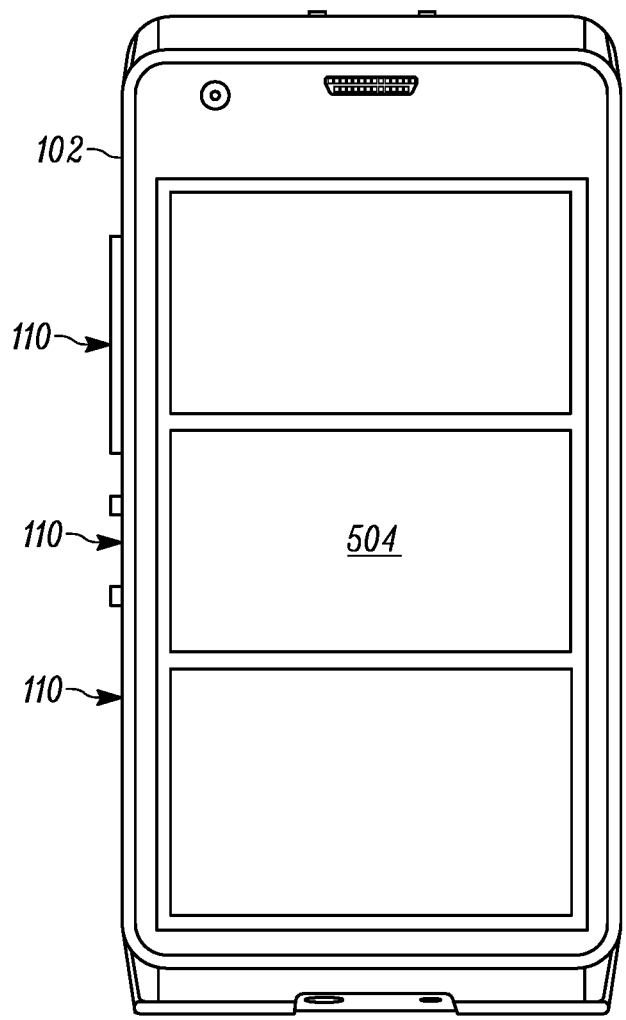

Similarly, a user may also return from an application view to the tile that spawned the application view. For example, as illustrated in FIG. 8A, the electronic processor 205 receives a third gesture-based input 802 (for example, a double-finger press) corresponding to the first application view 702. As illustrated in FIG. 8A, the electronic processor 205 may display the first and second icons 506, 508. In one embodiment, the second icon 508 corresponds to the vertical-scrolling application that produced the original selected tile 504. As illustrated in FIG. 8B, and similar to the method 300 described above, the electronic processor receives a fourth gesture-based input 804 (for example, a swipe) to select the second icon 508, and in response to the fourth gesture-based input 804, replaces the first application view 702 with the selected tile 504 (for example, the original content of the selected tile 504) (see FIG. 8C). In some embodiments, a single gesture (for example, a double-finger press or a swipe) on the first application view 702 may replace the first application view 702 with the original content of the selected tile 504.

Figure 9:
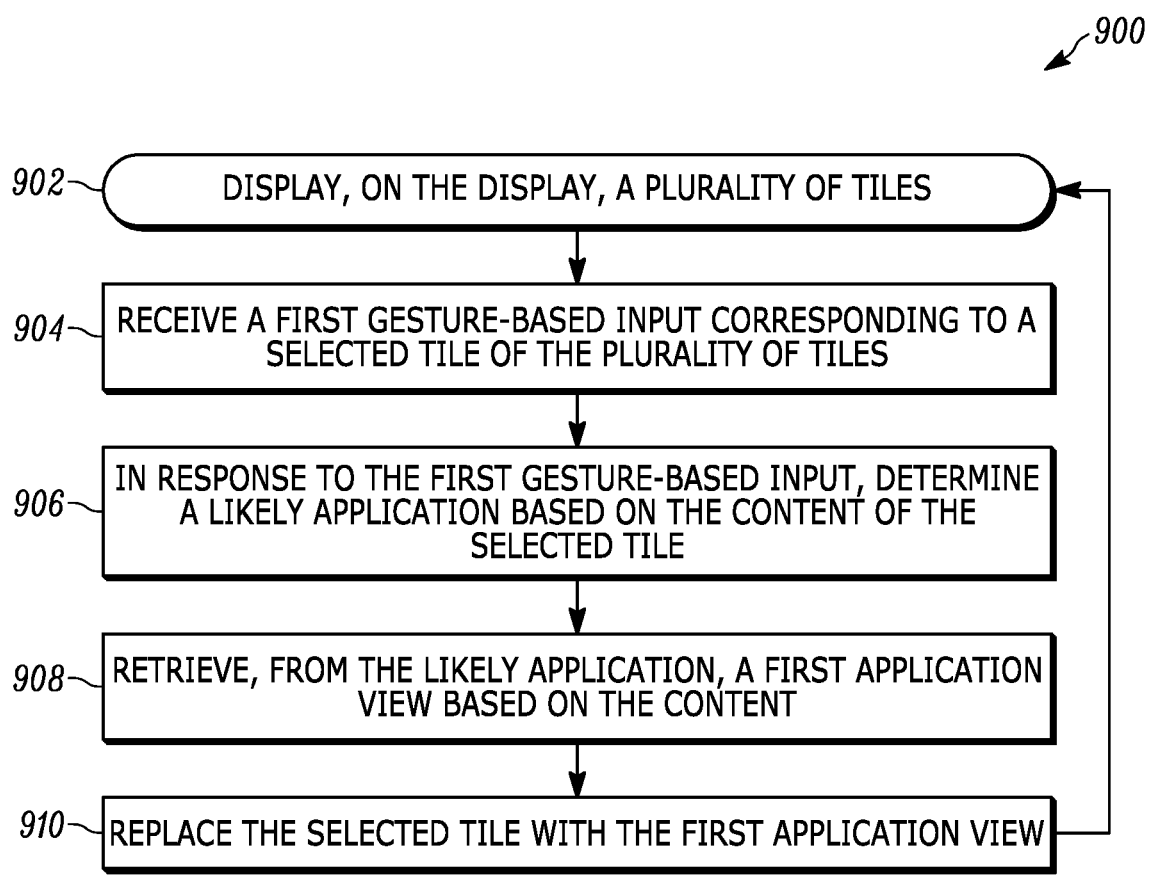
FIG. 9 is a flowchart of a method of content presentation selection in accordance with some embodiments.

FIG. 9 illustrates an example method 900 for content presentation selection on the portable electronic device 102. The method 900 is described as being performed by the portable electronic device 102 and, in particular, the electronic processor 205. However, it should be understood that in some embodiments, portions of the method 900 may be performed by other devices, including for example, the server 104.

At block 902, the electronic processor 205 displays, on a display of a portable device, a plurality of tiles, as described above. At block 904, the electronic processor 205 receives a first gesture-based input corresponding to a selected tile of the plurality of tiles, as described above.

At block 906, in response to the first gesture-based input, the electronic processor 205 determines a likely application based on the content of the selected tile. Selection of a likely application is performed similarly to the selection of a first application 245, as described above. For example, when the content includes an address of an incident, the likely application is a mapping application. At block 908, the electronic processor 205 retrieves, from the likely application, a first application view based on the content, as described above. At block 910, the electronic processor 205 replaces the selected tile with the first application view, as described above. However, unlike the process described with respect to the method 300 in certain embodiments of method 900, the electronic processor 205 replaces the selected tile with the first application view without receiving a second gesture-based input. For example, a double-finger press on the selected tile results in the selected tile being replaced with the first application view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for content presentation selection, the method comprising:
   displaying, on a display of a portable device, a plurality of tiles, wherein each of the plurality of tiles includes a displayed content;
   receiving a first gesture-based input corresponding to a selected tile of the plurality of tiles, wherein the first gesture-based input is one selected from a group consisting of a double-finger tap input and a double-finger press input;
   in response to receiving the first gesture-based input, identifying a data type of the displayed content of the selected tile, wherein identifying the data type includes performing natural language processing on the displayed content;
   selecting a first application based on the data type;
   superimposing, on or near a first portion of the selected tile, a first icon corresponding to the first application;
   receiving a swipe input swiping on the selected tile toward the first portion;
   in response to receiving the swipe input, retrieving, from the first application, a first application view based on the displayed content; and
   replacing the selected tile with the first application view.

2. The method of claim 1, wherein identifying a data type includes identifying at least one selected from the group consisting of a person description, a vehicle description, an address, and an incident report.

3. The method of claim 1, further comprising:
   selecting a second application based on the displayed content of the selected tile; and
   superimposing, on a second portion of the selected tile, a second icon corresponding to the second application;
   wherein receiving a second gesture-based input includes receiving an input corresponding to a selection of either the first icon or the second icon.

4. The method of claim 1, further comprising:
   receiving a third gesture-based input corresponding to the first application view;
   receiving a fourth gesture-based input; and
   in response to the fourth gesture-based input, replacing the first application view with the selected tile.

5. The method of claim 1, wherein selecting a first application based on the displayed content of the selected tile includes selecting a mapping application based on an address.

6. The method of claim 5, further comprising:
   determining a map view based on the address; and
   determining a geofence based on the address;
   wherein retrieving a first application view includes retrieving a map based on the map view and the geofence.

7. A system for content presentation selection, the system comprising:
   a display; and
   an electronic processor coupled to the display and configured to
   display, on the display, a plurality of tiles, wherein each of the plurality of tiles includes a displayed content;
   in response to receiving the first gesture-based input, receive a first gesture-based input corresponding to a selected tile of the plurality of tiles, wherein the first gesture-based input is one selected from a group consisting of a double-finger tap input and a double-finger press input;
   identifying a data type of the displayed content of the selected tile, wherein identifying the data type includes performing natural language processing on the displayed content;
   select a first application based on the data type;
   superimpose, on or near a first portion of the selected tile, a first icon corresponding to the first application;
   receive a swipe input swiping on the selected tile toward the first portion;
   in response to receiving the swipe input, retrieve, from the first application, a first application view based on the displayed content; and
   replace the selected tile with the first application view.

8. The system of claim 7, wherein the data type is at least one selected from the group consisting of a person description, a vehicle description, an address, and an incident report.

9. The system of claim 7, wherein the electronic processor is further configured to
   select a second application based on the displayed content of the selected tile; and
   superimpose, on or near a second portion of the selected tile, a second icon corresponding to the second application;
   wherein the second gesture-based input corresponds to a selection of either the first icon or the second icon.

10. The system of claim 7, wherein the electronic processor is further configured to
    receive a third gesture-based input corresponding to the first application view;
    receive a fourth gesture-based input; and
    in response to the fourth gesture-based input, replace the first application view with the selected tile.

11. The system of claim 7, wherein the electronic processor is further configured to select a mapping application based on an address.

12. The system of claim 11, wherein the electronic processor is further configured to
    determine a map view based on the address;
    determine a geofence based on the address; and
    retrieve, from the first application, a map based on the map view and the geofence.

13. A method for content presentation selection, the method comprising:
    displaying, on a display of a portable device, a plurality of tiles, wherein each of the plurality of tiles includes a displayed content;
    receiving a first gesture-based input corresponding to a selected tile of the plurality of tiles, wherein the first gesture-based input is one selected from a group consisting of a double-finger tap input and a double-finger press input;
    identifying a data type of the displayed content of the selected tile, wherein identifying the data type includes performing natural language processing on the displayed content;
    in response to the first gesture-based input, determining, with an electronic processor of the portable device, a likely application based on the data type;
    retrieving, from the likely application, a first application view based on the displayed content; and
    replacing the selected tile with the first application view.

* * * * *